(12) United States Patent
Ly

(10) Patent No.: US 7,933,708 B2
(45) Date of Patent: Apr. 26, 2011

(54) SYSTEMS AND METHODS FOR ASSISTING IN ACCELERATION OF A VEHICLE DURING VEHICLE RE-ACCELERATION

(75) Inventor: Tai Joey Ly, Alhambra, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 837 days.

(21) Appl. No.: 11/891,428

(22) Filed: Aug. 10, 2007

(65) Prior Publication Data

US 2009/0043471 A1 Feb. 12, 2009

(51) Int. Cl.
G06F 19/00 (2006.01)

(52) U.S. Cl. ............................................. 701/70; 701/56

(58) Field of Classification Search .................... 701/56, 701/70; 477/99, 120, 132, 133
See application file for complete search history.

(56) References Cited

U.S. PATENT DOCUMENTS

| | | | |
|---|---|---|---|
| 4,334,442 A * | 6/1982 | Iwanaga et al. ............... | 477/128 |
| 4,829,433 A | 5/1989 | Nakano et al. | |
| 5,154,099 A * | 10/1992 | Asatsuke et al. .............. | 477/127 |
| 5,549,519 A * | 8/1996 | Seidel et al. .................. | 477/125 |
| 5,769,754 A | 6/1998 | Kil | |
| 5,800,307 A | 9/1998 | Choi | |
| 5,803,865 A * | 9/1998 | Harada et al. ................. | 477/119 |
| 5,813,942 A | 9/1998 | Nakagawa et al. | |
| 6,837,825 B2 | 1/2005 | Nakayama et al. | |
| 6,896,640 B2 | 5/2005 | Kurabayashi | |
| 2003/0104903 A1 * | 6/2003 | Kurabayashi ................... | 477/48 |
| 2003/0162633 A1 * | 8/2003 | Nakayama et al. ............ | 477/120 |
| 2004/0087415 A1 * | 5/2004 | Vornehm ....................... | 477/115 |
| 2008/0058152 A1 * | 3/2008 | Ortmann ........................... | 477/3 |

* cited by examiner

Primary Examiner — Mark Hellner
Assistant Examiner — Helal A Algahaim
(74) Attorney, Agent, or Firm — Dinsmore & Shohl LLP

(57) ABSTRACT

In some embodiments, systems and methods are provided for assisting in acceleration of a vehicle during re-acceleration. In one embodiment, a system comprises one or more sensors that monitor vehicular conditions, which are transmitted to and processed by an electronic controller. When the processed signals indicate re-acceleration of the vehicle, the electronic controller activates an aggressive schedule or aggressive throttle map that defines instructions for downshifting a transmission gear position or for increasing a throttle so as to assist in acceleration of the vehicle during re-acceleration. The electronic controller activates the instructions when one or more vehicular conditions of accelerator pedal depression exceed a predefined value during re-acceleration. The electronic controller selects the instructions most appropriate for assisting in acceleration according to the processed signals. The signals are transmitted to a transmission system that downshifts the transmission gear position or to an engine that increases the throttle.

7 Claims, 4 Drawing Sheets

SYSTEMS AND METHODS FOR ASSISTING IN ACCELERATION OF A VEHICLE DURING VEHICLE RE-ACCELERATION

TECHNICAL FIELD

This invention generally relates to systems and methods for assisting in acceleration of a vehicle during vehicle re-acceleration. More specifically, some embodiments of the systems and methods generally activate an aggressive schedule selecting a best transmission gear, and/or increasing throttle, where vehicular conditions indicate vehicle re-acceleration.

BACKGROUND

Generally, vehicles are provided with a transmission shift schedule configured to shift a transmission gear position of a transmission system of the vehicle according to changing vehicular conditions during vehicle travel. In particular, the shift schedule may effectuate a change in the transmission gear position based upon vehicle speed and accelerator pedal depression. As is common in most vehicles, a user may depress an accelerator pedal or similar device to indicate a desire to increase the speed of the vehicle. Based upon the accelerator pedal depression, the current vehicle speed and the current transmission gear ratio, a transmission gear position change may be effectuated. For example, if a user depresses the accelerator pedal moderately (indicating a desire to increase the speed of the vehicle) the transmission shift schedule may maintain the current transmission gear position to achieve the desired speed. However, if a user depresses the accelerator pedal excessively (indicating a desire to greatly increase the speed of the vehicle) the transmission shift schedule may downshift the transmission gear position to achieve the desired speed.

Subsequent to vehicle deceleration (without completely stopping), a user may desire to accelerate, or, more specifically, re-accelerate, the vehicle with moderate accelerator pedal depression. However, current shift schedules may not permit a downshift to a lower transmission gear position to achieve such moderate re-acceleration during such situations. Therefore, the user might further depress the accelerator pedal in this situation to re-accelerate the vehicle as desired. Such excessive accelerator pedal depression may initiate a downshift to a lower transmission gear position, but may also re-accelerate the vehicle more rapidly than desired by the user. To minimize such over-acceleration while re-accelerating, the user may quickly release the depression of the accelerator pedal, thereby causing the vehicle to decelerate and upshift to the next transmission gear ratio. Such sudden accelerator pedal depression and transmission gear position change soon followed by a sudden release of the accelerator pedal may adversely affect vehicle performance. Accordingly, there is a need to assist acceleration of a vehicle during re-acceleration without having to depress the accelerator pedal excessively.

SUMMARY

According to one embodiment, a method of assisting in acceleration of a vehicle during vehicle re-acceleration may comprise monitoring various vehicular conditions during vehicle travel with one or more sensors of the vehicle, transmitting signals indicative of the vehicular conditions from the sensors to an electronic controller of the vehicle, processing the transmitted signals with the electronic controller, and activating an aggressive schedule of the vehicle with the electronic controller. The aggressive schedule may be activated where the processed signals indicate re-acceleration of the vehicle. The aggressive schedule may define instructions for assisting in acceleration of the vehicle during vehicle re-acceleration, the instructions being configured for: a downshifting of a transmission gear position of a transmission system of the vehicle, or an increasing of a throttle of an engine of the vehicle. The method may further comprise generating signals according to the aggressive schedule with the electronic controller when one or more vehicular conditions of accelerator pedal depression exceed a predefined value during re-acceleration. Further, the method may comprise using the generated signals to cause downshifting of the transmission gear position or increasing of the throttle of the engine.

According to another embodiment, a system for assisting in acceleration of a vehicle during vehicle re-acceleration may comprise one or more sensors configured to monitor various vehicular conditions indicative of vehicle travel, wherein the sensors are configured to transmit sensor signals indicative of the vehicular conditions. The system may also comprise an electronic controller configured to process the sensor signals and an aggressive schedule configured to assist in acceleration of the vehicle during vehicle re-acceleration, the schedule being configured for at least one of: a downshifting of a transmission gear position of a transmission system of the vehicle and an increasing of a throttle of an engine of the vehicle. The electronic controller may activate the aggressive schedule when the processed sensor signals indicate re-acceleration of the vehicle. Further, the electronic controller may generate command signals according to the aggressive schedule when one or more vehicular conditions of accelerator pedal depression exceed a predefined value during re-acceleration. The system may further comprise circuitry configured to transmit the sensor signals to the electronic controller and the command signals to at least one of a transmission system and an engine of the vehicle. The system may further comprise a transmission system configured to downshift the transmission gear position in response to at least one of the command signals. In addition, the system may comprise an engine configured to increase the throttle in response to at least one of the command signals.

According to yet another embodiment, a vehicle comprises a system for assisting in acceleration of the vehicle during vehicle re-acceleration. The system may comprise one or more sensors configured to monitor various vehicular conditions indicative of vehicle travel. The sensors may be configured to transmit sensor signals indicative of the vehicular conditions. The system may also comprise an electronic controller configured to process the sensor signals. Further, the system may comprise programmed instructions configured to assist in acceleration of the vehicle during vehicle re-acceleration, the instructions being configured for at least one of: a downshifting of a transmission gear position of a transmission system of the vehicle, and an increasing of a throttle of an engine of the vehicle. The electronic controller can activate an aggressive schedule when the processed signals indicate re-acceleration of the vehicle. In addition, the electronic controller can accesses the instructions when the sensor signals indicate a vehicle re-acceleration condition, and generates command signals based on the instructions. The system may further comprise circuitry configured to transmit the sensor signals to the electronic controller and the command signals to a transmission system or to an engine of the vehicle. The transmission system can downshift the transmission gear position or the engine can increase the throttle in response to the command signals.

BRIEF DESCRIPTION OF THE DRAWINGS

It is believed that the present invention will be better understood from the following description taken in conjunction with the accompanying drawings in which.

DETAILED DESCRIPTION OF ILLUSTRATIVE EMBODIMENTS

Embodiments of the present invention generally relate to systems and methods for assisting in acceleration of a vehicle during vehicle re-acceleration. For purposes of the present application, it is to be understood that the term "re-acceleration" means a depression of an accelerator pedal of a vehicle subsequent to a deceleration of the vehicle not including a vehicle stop. For example, but not by way of limitation, re-acceleration may occur: where an operator of the vehicle releases a depression of the accelerator pedal, allows the vehicle to decelerate without stopping and without depression of the brake pedal, and applies a second depression of the accelerator pedal to re-accelerate; where an operator of the vehicle releases a depression of the accelerator pedal, depresses the brake pedal to decelerate without stopping, and applies a second depression of the accelerator pedal to re-accelerate; where an operator is driving or decelerating at low speed (e.g. 5-20 mph) and wishes to accelerate; where an operator is in low speed traffic; and where an operator is in a rolling stop (e.g. California Rolling Stop).

Figure 3:
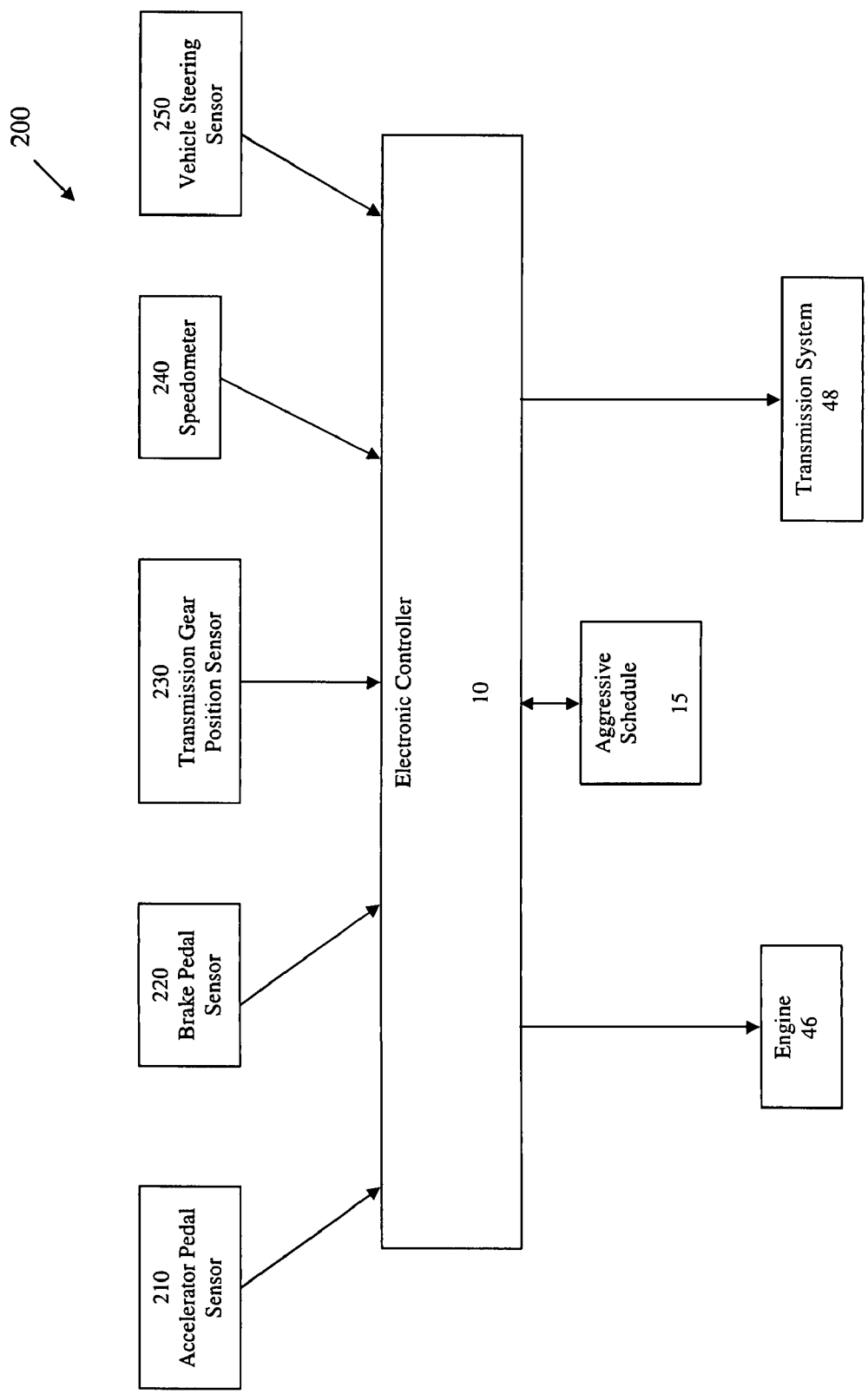
FIG. 3 is a diagram depicting an example of a system for assisting in acceleration of a vehicle during vehicle re-acceleration, in accordance with one embodiment of the present invention.

Referring to the figures in detail, FIG. 3 illustrates one embodiment of a system 200 for assisting in acceleration of a vehicle during vehicle re-acceleration. The system 200 comprises one or more sensors as well as an electronic controller ("EC") 10, which accesses a programmed aggressive schedule 15, and utilizes appropriate controller circuitry.

According to one embodiment, the sensors of the system 200 comprise an accelerator pedal sensor 210 and one or more of: a brake pedal sensor 220, a transmission gear position sensor 230, a speedometer 240, and a vehicle steering sensor 250. According to another embodiment, the sensors of the system 200 comprise an accelerator pedal sensor 210, a brake pedal sensor 220, a transmission gear position sensor 230, a speedometer 240, and a vehicle steering sensor 250. Other embodiments of the system 200 are contemplated where other or additional sensors are employed by the system 200 for assisting in acceleration of a vehicle during vehicle re-acceleration.

The sensors of the system 200 are for monitoring vehicular conditions indicative of vehicle travel. More particularly, the sensors may be configured to monitor any various vehicular conditions, which may vary with vehicle travel, such as, but not limited to, those represented in FIG. 1.

The accelerator pedal sensor 210 may be configured to monitor the vehicular conditions of degree of accelerator pedal depression 20, rate of accelerator pedal depression 22, and duration from release of one accelerator pedal depression to application of a second accelerator pedal depression 32. The brake pedal sensor 220 may be configured to monitor the vehicular conditions of brake on pressure 30 and brake on duration 28. The transmission gear position sensor 230 may be configured to monitor the vehicular conditions of transmission gear position 34 and vehicle speed within range 24. The speedometer 240 may be configured to monitor the vehicular condition of vehicle speed. The vehicle steering sensor 250 may be configured to monitor the vehicular condition of amount of steering wheel turning 26. It is contemplated that the sensors 210, 220, 230, 240, and 250 may be configured to monitor other or additional vehicular conditions to aid the system 200 in assisting vehicle acceleration during vehicle re-acceleration.

As further depicted in FIG. 3, the sensors further may be configured to transmit signals indicative of the vehicular conditions to the EC 10 of the system 200. The EC 10 then processes the transmitted signals to determine the type of vehicle travel occurring. The EC 10 may comprise an electronic control unit configured to perform the processing of the signals. For exemplary purposes only, a combination of signals such as at least 100 degrees of accelerator pedal depression/second, between 1 second and 2 seconds from a release of a first accelerator pedal depression to an application of a second accelerator pedal depression, and less than 2 seconds of brake on pressure may indicate a pattern of vehicle re-acceleration. It is contemplated that various other values and combinations of conditions and/or the monitoring of other or additional vehicular conditions may indicate types of vehicle travel.

After processing the signals transmitted from the sensors, the EC 10 may activate an aggressive schedule 15 of the system 200 when the processed signals indicate re-acceleration of the vehicle. The aggressive schedule 15 may be configured to assist in acceleration of the vehicle during vehicle re-acceleration. Generally, the aggressive schedule 15 defines instructions for a downshifting of a transmission gear position of the transmission system and for an increasing of a throttle of an engine. Either instructions for downshifting or for increasing the throttle, or both, will serve to improve vehicle performance during re-acceleration. More particularly, downshifting or increasing the throttle, or both, in accordance with the instructions defined by the aggressive schedule 15, allows the operator to accelerate to a desired speed during re-acceleration without having to depress the accelerator pedal to an excessive degree. The EC 10 may select the schedule or instructions most appropriate for assisting in acceleration of the vehicle during vehicle re-acceleration according to the processed signals.

When the processed signals indicate vehicle re-acceleration and the aggressive schedule 15 is activated, the EC 10 may generate instructions or signals in accordance with those defined by the aggressive schedule 15. According to one embodiment, the EC 10 generates instructions for the downshifting of the transmission gear position or for the increasing of the throttle. According to another embodiment, the EC generates the instructions both for the downshifting of the transmission gear position and for the increasing of the throttle.

Generally, the EC 10 generates instructions for the downshifting of the transmission gear position or for the increasing of the throttle, or both, when one or more vehicular conditions of accelerator pedal depression exceed a predefined value during re-acceleration. According to one embodiment, the one or more vehicular conditions of accelerator pedal depression are a degree of accelerator pedal depression and a rate of accelerator pedal depression. It is contemplated that other vehicular conditions of accelerator pedal depression may determine whether the EC 10 may generate instructions for downshifting or for increasing the throttle.

By way of example only, the predefined value for the degree of second time accelerator pedal depression sufficient for the EC 10 to generate the instructions according to the aggressive schedule 15 may be between 0 degrees and 84 degrees. Further, by way of example only, the predefined value of the rate of accelerator pedal depression sufficient for the EC 10 to generate the instructions according to the aggressive schedule 15 may be between 50 degrees of depression/second and 1500 degrees of depression/second. Therefore, in accordance with one embodiment, if conditions indicate a re-acceleration event, then whether the EC 10 switches to the aggressive schedule 15 may be dependant on other factors, such as conditions regarding the degree of accelerator pedal depression and/or the rate of accelerator pedal depression. It is contemplated that other predefined values for the degree and/or the rate of accelerator pedal depression may be established. Such predefined values may vary according to different vehicle models.

The system 200 may also comprise circuitry configured to transmit the signals of the sensor to the EC 10 and for transmitting the instructions from the EC 10 to the transmission system 48 or to the engine 46 of the vehicle. The circuitry may also transmit both the instructions to the transmission system 48 and the instructions to the engine 46. Thereafter, in accordance with the instructions (e.g. the command signals, data, code, or program) defining the aggressive schedule 15, the transmission system 48 downshifts the transmission gear position and the engine 46 increases the throttle. For example, the EC or other controller can send a signal to an electronic transmission controller that causes an electrical shift solenoid to become activated to carry out the downshift or the increase in throttle. It is contemplated that any circuitry or devices suitable to carry out the functions described herein may be employed by the system 200.

According to another embodiment, the present invention generally relates to methods of assisting in acceleration of a vehicle, as shown at block 110 during vehicle re-acceleration. FIG. 2 illustrates a flowchart depicting an embodiment of such a method 100. As shown in FIG. 2, the method 100 may comprise monitoring various vehicular conditions during vehicle travel 100 with one or more sensors of the vehicle. According to one embodiment, shown in FIG. 1, the vehicular conditions may comprise: degree of accelerator pedal depression; rate of accelerator pedal depression; transmission gear position, vehicle speed permissible within range, steering wheel position (whether the vehicle is turning), brake on pressure, brake on duration, and duration from release of a first accelerator pedal depression to application of a second accelerator pedal depression. According to another embodiment, the vehicular conditions may comprise: at least one of degree of accelerator pedal depression and rate of accelerator pedal depression and one or more of: transmission gear position, vehicle speed permissible within range, steering wheel position, brake on pressure, brake on duration, and duration from release of a first accelerator pedal depression to application of a second accelerator pedal depression.

As shown in FIG. 2, the method 100 may further comprise transmitting signals indicative of the vehicular conditions (block 120) from the sensors to an EC of the vehicle. Thereafter, the method 100 may further comprise processing the transmitted signals (block 130) with the EC so that the monitored vehicular conditions may be analyzed conjunctively and simultaneously. This conjunctive and simultaneous analysis of the processed signals allows for an accurate determination of whether vehicle re-acceleration is occurring. More particularly, if the processed signals indicate re-acceleration of the vehicle, then the method 100 generally comprises selecting (preparing or accessing) an aggressive schedule of the vehicle with the EC, as shown in block 140.

It may be desired, though, to first check if certain additional conditions are present before proceeding with the activation. For example, the degree and the rate of the second accelerator pedal depression may be monitored to determine if the aggressive schedule should be activated. In one embodiment, if the degree exceeds 50 degrees and the rate exceeds 1000 degrees of depression/second, then the aggressive schedule is activated (see FIG. 1, blocks 36 and 38).

This aggressive schedule may be configured to assist in acceleration of a vehicle during vehicle re-acceleration. Generally, as described above, the aggressive schedule defines instructions for a downshifting of a transmission gear position or for an increasing of a throttle. The EC may select the instructions most appropriate for assisting in acceleration of the vehicle during vehicle re-acceleration according to the processed signals The method 100 may further comprise activating the aggressive schedule with the EC (block 150 when one or more vehicular conditions of accelerator pedal depression exceed a predefined value during re-acceleration. The one or more vehicular conditions of accelerator pedal depression that permit the EC to generate the instructions typically, but not necessarily, are a degree of accelerator pedal depression and a rate of accelerator pedal depression.

Figure 1:
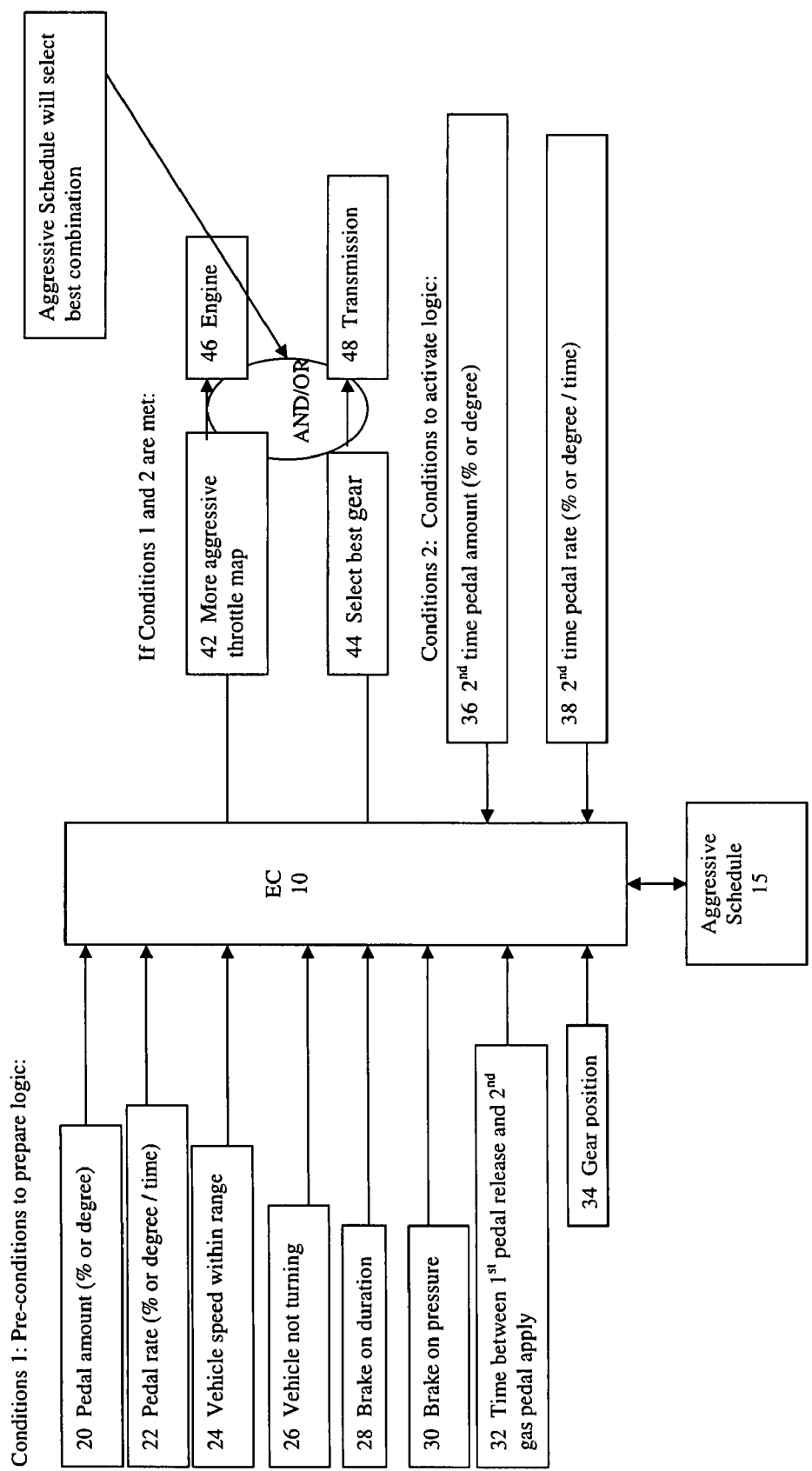
FIG. 1 is a logic diagram depicting an example of a method of assisting in acceleration of a vehicle during vehicle re-acceleration, in accordance with one embodiment of the present invention.
Figure 2:
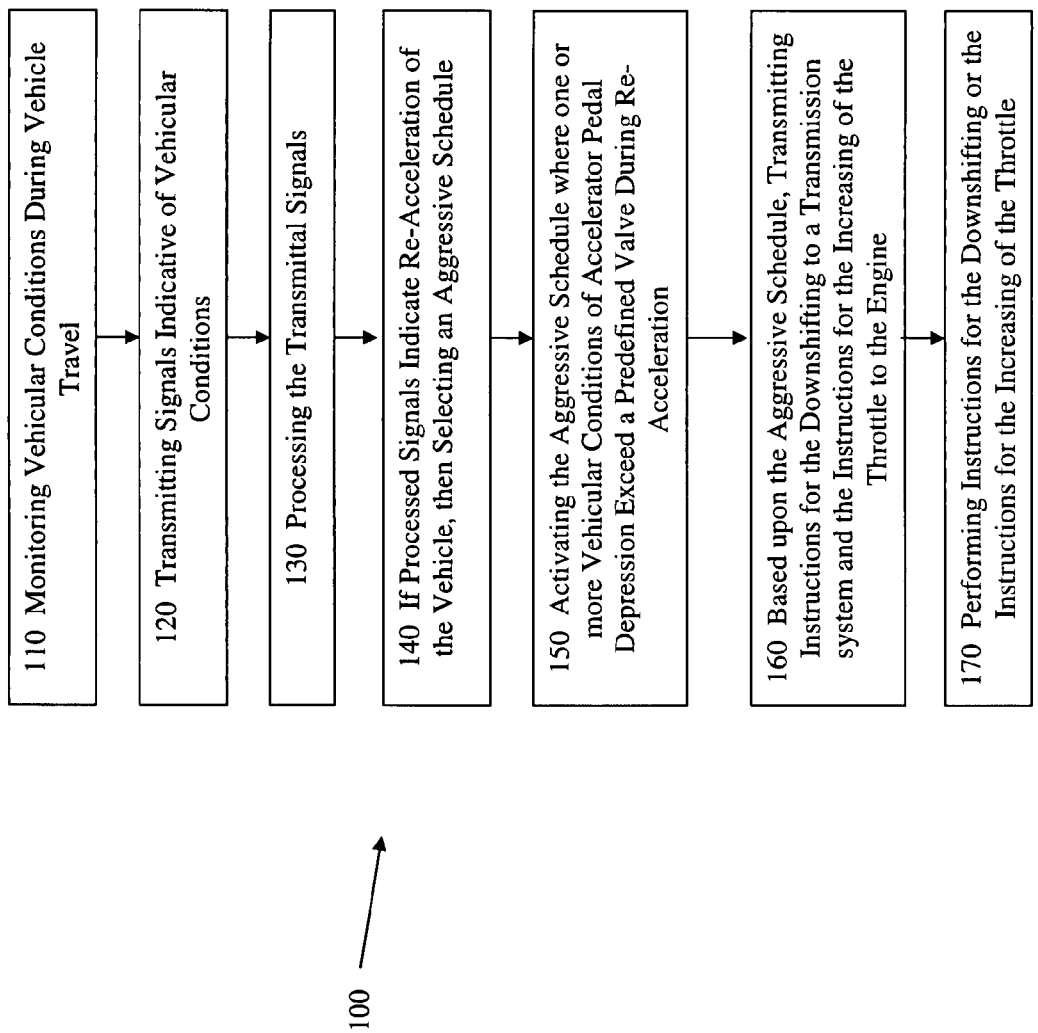
FIG. 2 is a flowchart depicting an example of a method of assisting in acceleration of a vehicle during vehicle re-acceleration, in accordance with one embodiment of the present invention.

After the aggressive schedule has been activated by the EC, the method 100 may comprise transmitting instructions for the downshifting of the transmission gear position to the transmission system and/or instructions for the increasing of the throttle to the engine (as shown in block 160 of FIG. 2 and/or as shown in FIG. 1). Thereafter, the method 100 generally comprises performing the instructions for the downshifting by the transmission system and/or the instructions for the increasing of the throttle by the engine (block 170). The EC can select the best combination of these instructions based upon a tractive force map.

Figure 4:
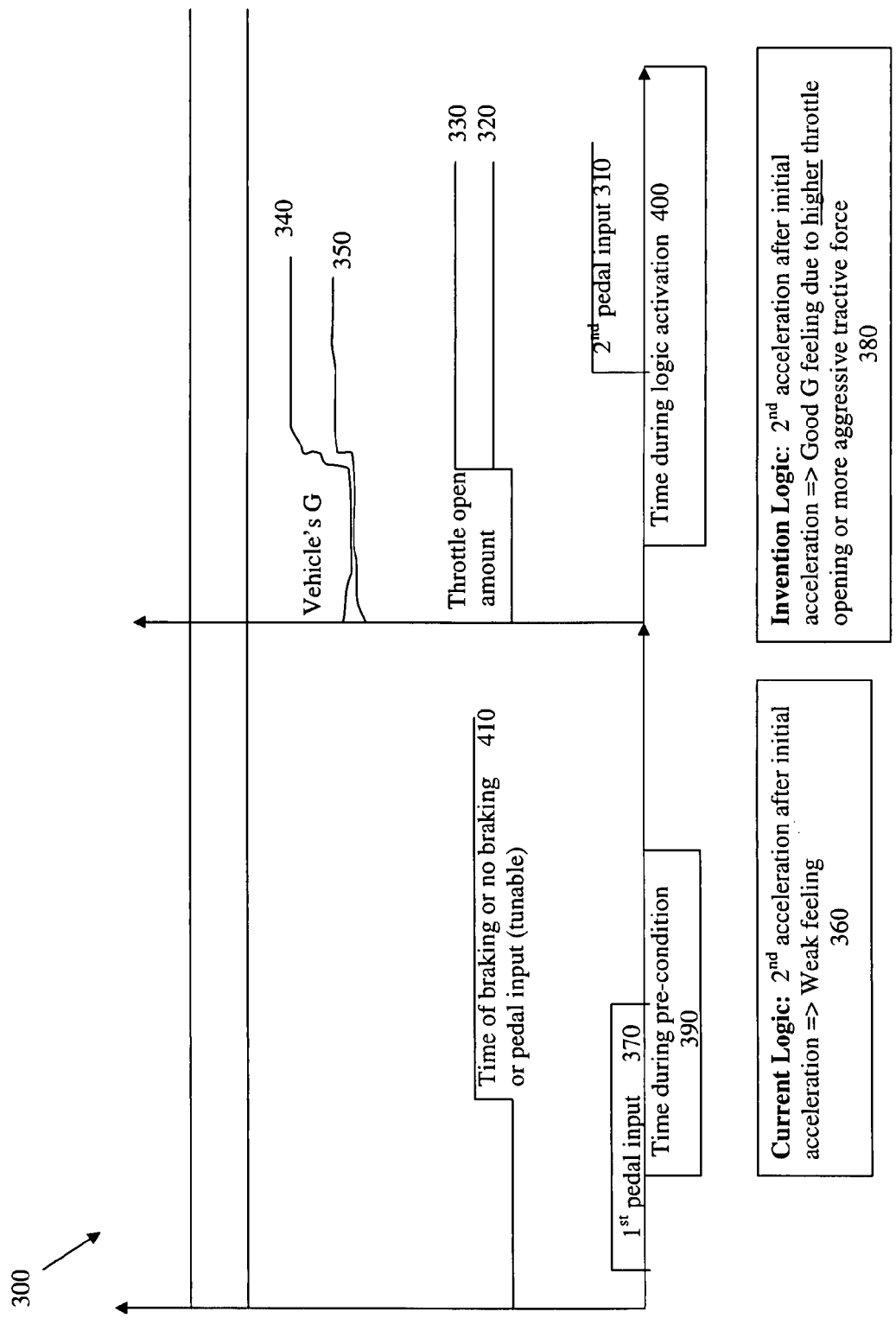
FIG. 4 is a timing diagram depicting an example of a system for assisting in acceleration of a vehicle during vehicle re-acceleration, in accordance with one embodiment of the present invention.

FIG. 4 is a timing diagram depicting an example of a system for assisting in acceleration of a vehicle during vehicle re-acceleration. The timing diagram of FIG. 4 depicts a tractive force map 300 that illustrates a greater opening of the throttle from point 320 to point 330 with the second accelerator pedal depression 310 when a vehicle is provided with an embodiment of a system described herein. The tractive force map 300 distinguishes between a time during pre-condition 390 and a time during logic activation (aggressive schedule) 400. The time during pre-condition 390 can comprise a first accelerator pedal depression, or input, 370 and a time of braking or no braking or accelerator pedal input 410. More particularly, the tractive force map 300 describes the logic (block 360) where a second accelerator pedal depression 310 after a first accelerator pedal depression 370 results in a weak feeling of the vehicle during re-acceleration. This weak feeling during re-acceleration is illustrated in the lower throttle opening 320 and the lower G characteristic 350 of the vehicle. The tractive force map 300 further describes embodiments of the present invention (block 380) where a second accelerator pedal depression 310 after a first accelerator pedal depression 370 produces a stronger G characteristic 340 due to the greater throttle opening 330, or the more aggressive tractive force.

According to one embodiment, the method 100 may comprise generating (block 150), transmitting (block 160), and performing (block 170) the instructions for the downshifting of the transmission gear position or the instructions for the increasing of the throttle. According to another embodiment, the method 100 may comprise generating (block 150), transmitting (block 160), and performing (block 170) both the instructions for the downshifting of the transmission gear position and the instructions for the increasing of the throttle.

According to yet another embodiment, the present invention generally relates to a vehicle comprising a system for assisting in acceleration of a vehicle during vehicle re-acceleration. The vehicle to which an embodiment of the system is applied may be one of any model of vehicles.

The foregoing description of the various embodiments of the invention has been presented for the purposes of illustration and description. It is not intended to be exhaustive or to limit the inventions to the precise forms disclosed. Many alternatives, modifications and variations will be apparent to those skilled in the art of the above teaching. Other embodiments will be apparent or relatively easily developed by those of ordinary skill in the art. Moreover, although multiple inventive aspects and features have been described, it should be noted that these aspects and features need not be utilized in combination in any particular embodiment. Accordingly, it is intended to embrace all alternatives, modifications, combinations and variations that have been discussed or suggested herein, as well as others that fall within the principles, spirit, and broad scope of the inventions as defined by the claims.

It is noted that recitations herein of a component of the present invention being "configured" to embody a particular property, function in a particular manner, etc., are structural recitations, as opposed to recitations of intended use. More specifically, the references herein to the manner in which a component is "configured" denotes an existing physical condition of the component and, as such, is to be taken as a definite recitation of the structural characteristics of the component.

It should be understood that the EC may perform such calculation/processing via programs, firmware, fuzzy logic, neural networks or other electronic algorithms now known or hereafter developed for assisting in vehicle acceleration during re-acceleration. The algorithms, methods, and shift schedules illustrated may be embodied as a program, code, or instructions executed by a computer, controller, or other processing circuit.

It is noted that terms like "generally," "commonly," and "typically" are not utilized herein to limit the scope of the claimed embodiments or to imply that certain features are critical, essential, or even important to the structure or function thereof. Rather, these terms are merely intended to highlight alternative or additional features that may or may not be utilized in a particular embodiment.

What is claimed is:

1. A method of assisting in acceleration of a vehicle during vehicle re-acceleration, the method comprising:
   monitoring various vehicular conditions during vehicle travel with one or more sensors of the vehicle;
   transmitting signals indicative of the vehicular conditions from the sensors to an electronic controller of the vehicle;
   processing the transmitted signals with the electronic controller;
   activating an aggressive schedule of the vehicle with the electronic controller when the processed signals indicate re-acceleration of the vehicle, wherein re-acceleration is indicated when an accelerator pedal depression occurs subsequent to deceleration of the vehicle without stopping, and wherein the aggressive schedule defines instructions for assisting in acceleration of the vehicle during vehicle re-acceleration, the instructions being configured for:
   a. a downshifting of a transmission gear position of a transmission system of the vehicle, or
   b. an increasing of a throttle of an engine of the vehicle;
   generating signals according to the aggressive schedule with the electronic controller when one or more vehicular conditions of accelerator pedal depression exceed a predefined value during re-acceleration;
   using the generated signals to cause downshifting of the transmission gear position or increasing of the throttle of the engine.

2. The method of claim 1, wherein the electronic controller selects the instructions most appropriate for assisting in acceleration of the vehicle during vehicle re-acceleration according to the processed signals.

3. The method of claim 1, wherein the method comprises activating both the instructions for the downshifting of the transmission gear position and the instructions for the increasing of the throttle.

4. The method of claim 1, wherein the one or more vehicular conditions of accelerator pedal depression comprise a degree of accelerator pedal depression and a rate of accelerator pedal depression.

5. The method of claim 4, wherein:
   the predefined value for the degree of accelerator pedal depression sufficient for generating the instructions according to the aggressive schedule is between 10 degrees and 84 degrees; and
   the predefined value for the rate of accelerator pedal depression sufficient for generating the instructions according to the aggressive schedule is between 50 degrees of depression/second and 1500 degrees of depression/second.

6. The method of claim 1, wherein the vehicular conditions comprise:
   a. at least one of degree of accelerator pedal depression and rate of accelerator pedal depression; and
   b. one or more of:
      i. transmission gear position;
      ii. vehicle speed within range;
      iii. amount of steering wheel turning;
      iv. brake on pressure;
      v. brake on duration; and
      vi. duration from release of one accelerator pedal depression to application of a second accelerator pedal depression.

7. The method of claim 1, wherein the vehicular conditions comprise:
   a. degree of accelerator pedal depression;
   b. rate of accelerator pedal depression;
   c. transmission gear position;
   d. vehicle speed within range;
   e. amount of steering wheel turning;
   f. brake on pressure;
   g. brake on duration; and
   h. duration from release of one accelerator pedal depression to application of a second accelerator pedal depression.

* * * * *